Sept. 24, 1940.  R. L. ANDERSON  2,215,990
THRESHER
Filed Feb. 4, 1938  2 Sheets-Sheet 1
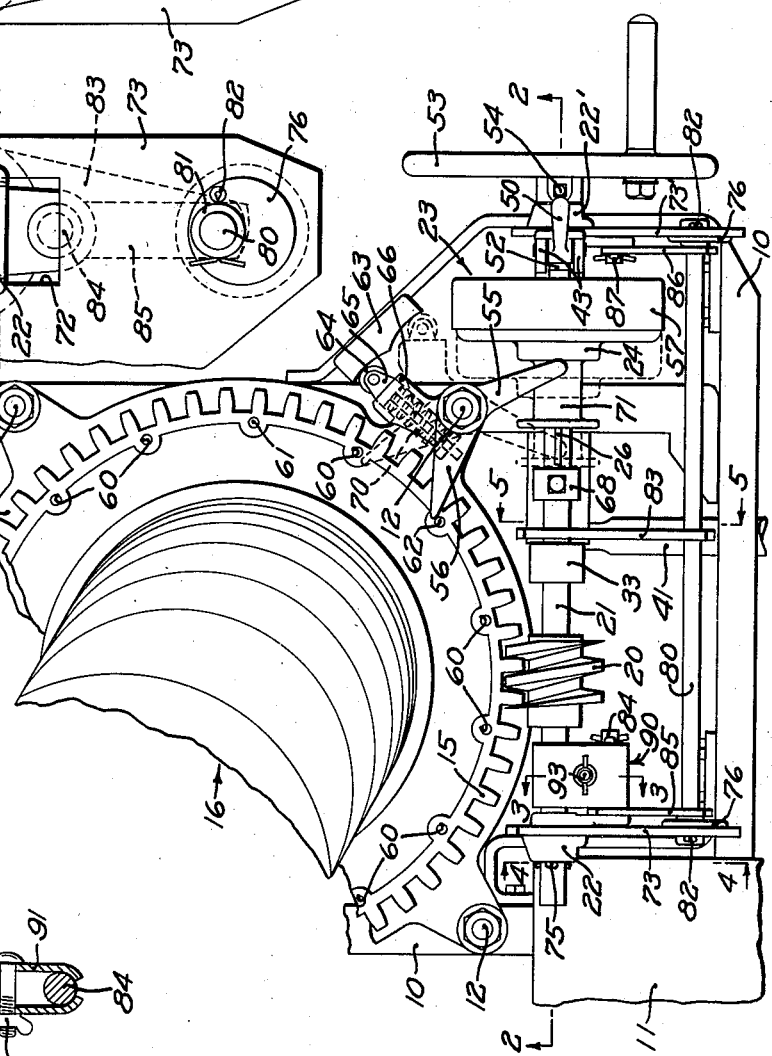
INVENTOR.
RALPH L. ANDERSON
BY
ATTORNEYS

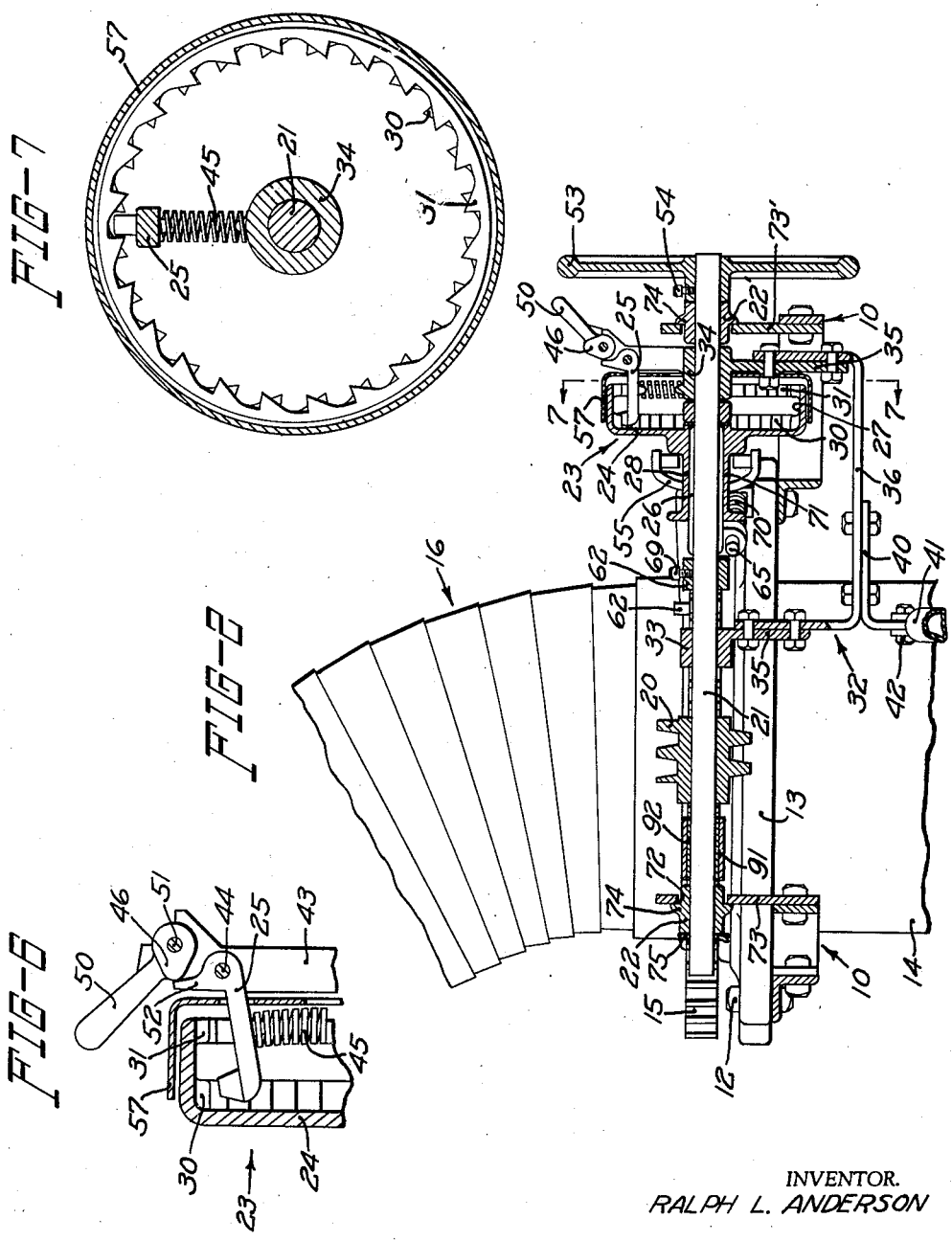

Patented Sept. 24, 1940

2,215,990

UNITED STATES PATENT OFFICE 2,215,990

THRESHER

Ralph L. Anderson, Moline, Ill., assignor to Deere & Company, Moline, Ill., a corporation of Illinois Application February 4, 1938, Serial No. 188,694

9 Claims. (Cl. 74—157)

The present invention relates generally to wind stackers of the type commonly used on threshing machines and the like, and more particularly to oscillating mechanism for swinging the pipe of a wind stacker back and forth to distribute material evenly upon the ground.

It is the principal object of the present invention to provide a simplified and improved mechanism for slowly oscillating the pipe of a wind stacker through a predetermined angle. In the accomplishment of this object, the present invention contemplates the use of a worm and gear drive in which the worm is rotated by a ratchet escapement comprising a ratchet gear having two sets of oppositely directed teeth, an oscillating pawl adapted to engage either set of teeth, and means for automatically shifting engagement of the pawl from one set of teeth to the other when the pipe has swung through the predetermined angle.

Another object is to provide means for disengaging the pawl from the ratchet teeth to permit turning the worm shaft by a crank or handwheel without interference from the ratchet.

Another object is to provide means for disengaging the worm from the worm gear so that the pipe may be manually swung around into transport position entirely independent of the oscillating mechanism and without using the handwheel.

Normally the friction between worm and worm gear is sufficient to resist the tendency of the worm shaft to turn backwards under the drag of the pawl over the ratchet tooth at the end of each stroke, but occasionally conditions are such that this friction is reduced below the point necessary to hold the worm shaft. The result is that the worm shaft oscillates slightly, turning backward sufficiently each time to prevent the pawl from catching the next tooth. With the above in view, it is another object of the present invention to provide means for applying a restraining force on the worm shaft to prevent any tendency to turn backward between strokes of the pawl.

These and other objects and advantages of the present invention will become apparent after consideration of the following detailed description of a preferred embodiment thereof, reference being had to the appended drawings, in which Figure 1 is a top view of a portion of a threshing machine wind stacker having oscillating mechanism embodying the principles of the present invention;

Figure 2 is a sectional side view taken along the line 2—2 of Figure 1;

Figure 3 is a sectional view, taken along the line 3—3 of Figure 1, of the worm shaft brake drawn to slightly larger scale;

Figure 4 is a sectional view, taken along the line 4—4 of Figure 1, drawn to enlarged scale;

Figure 5 is a sectional view, taken along the line 5—5 of Figure 1, and drawn to the same scale as Figure 4;

Figure 6 is an enlarged detail view of the ratchet pawl and release mechanism, showing the pawl disabled for hand operation of the mechanism; and Figure 7 is an enlarged sectional view taken along the line 7—7 of Figure 2.

Referring now to the drawings, the mechanism shown is supported on a frame, indicated generally by the reference numeral 10, made up of angle irons and straps suitably secured together and fixed to a frame member 11 of the threshing machine of which the present invention is a unit. Bolted to the frame 10 by bolts 12 is a supporting collar 13, the under side of which is fixed to the top of a stationary wind pipe 14. In register with the stationary pipe 14 and mounted on the top side of the collar 13 for rotation is a ring gear 15 to which is fixed the end of an oscillating wind pipe 16. Preferably, although not necessarily, the end portion of the oscillating pipe 16 is of flexible construction permitting the swinging end to be raised or lowered by means not illustrated but well known in the art.

Driving the ring gear 15 is a worm 20 which is fixed on a worm shaft 21 and the latter is journaled in bearing blocks 22 and 22' which will be described in more detail later. Disposed near one end of the worm shaft 21 is ratchet escapement mechanism, indicated in its entirety by the reference numeral 23 and comprising a ratchet gear 24 and oscillating pawl 25. The ratchet gear 24 comprises an annular rim 27 fixed to a hub 28 embracing the shaft 21 and slidable axially thereon, but is prevented from rotating relative to the shaft 21 by cooperative splines 26. The inner surface of the rim 27 is provided with two sets of axially spaced, oppositely directed internal ratchet teeth 30 and 31.

The pawl 25 is adapted to engage either set of teeth 30, 31, to turn the ratchet gear 24 in either direction selectively. Supporting the pawl 25 is a cradle, indicated generally by the reference numeral 32, comprising a pair of axially spaced bearings 33 and 34 journaled on the shaft 21 and having downwardly extending arms 35. A U- shaped member 36 extends between and is bolted to the arms 35, and fixed to the U-shaped member 36 is an angle bracket 40 to which a pitman 41 is connected by a pivot bolt 42. The pitman 41 is driven by any suitable means (not shown) and serves to rock the cradle 32 back and forth about the worm shaft 21 as an axis. Formed integrally with the bearing 34 and extending upwardly therefrom is a bifurcated bracket 43 to which the pawl 25 is pivotally connected by a pivot bolt 44. Holding the pawl 25 into engagement with the ratchet teeth is a compression spring 45 which bears at one end against the bearing 34 and at the other end against the pawl between the pivot bolt 44 and point of engagement. A cam 46 fixed to a hand lever 50 is connected by a pivot bolt 51 to the bracket 43 above and to the rear of pivot bolt 44, and is adapted to bear against a lip 52 on the pawl 25 to depress the latter out of engagement with the ratchet teeth. With the pawl 25 disengaged from the ratchet gear 24, the worm shaft 21 may be turned freely by means of a hand wheel 53 which is fixed to the shaft 21 by a set screw 54. A cover 57 which is apertured to receive the bearing 34 and pawl 25 is suitably fixed to the cradle 32 and extends over the ratchet gear 24 to enclose the escapement mechanism.

The swing of the wind pipe 16 is reversed in direction by sliding the ratchet gear 24 along the shaft 21 to shift engagement of the pawl 25 from one set of teeth 30, 31 to the other. To this end, a shifting fork 55 is pivotally supported on the collar 13, using one of the fastening bolts 12 as a pivot. Extending inwardly toward and above the ring gear 15 is a throw-out lever 56 formed integrally with the shifting fork 55. The ring gear 15 is perforated at evenly spaced intervals, as at 60, to receive trip pins 61 and 62, and the latter may be inserted into any two of the perforations 60 to trip the throw-out lever 56 when the wind pipe 16 has swung through the angle determined by the placement of the pins 61 and 62. In order that the shift may be made quickly and positively, the shifting fork 55 has been provided with a device for snapping the ratchet gear 24 from one position of engagement to the other. This device comprises a cam 63 fixed to one of the members of the frame 10 and having a high point intermediate its ends. A roller 63 journaled in the bifurcated head of a post 65 which is telescopically disposed within an arm 66 of the shifting fork 55 and urged outwardly therefrom by a spring 70, bears against the cam 63 and rides over the high point thereof when the shifting fork is turned. Thus it will be seen that turning of the fork 55 is resisted for half of the distance as the spring 70 is compressed by action of the roller 64 in climbing the high point of the cam 63, while turning through the last half of the distance is greatly accelerated by release of the energy stored in the compressed spring 70 as the roller 64 rides down the decline. The shifting fork 55 engages a wide groove 71 in the hub of the ratchet gear 24, providing for lost motion during the first half of the turning distance of the fork 55 in either direction. A collar 68 which is fixed to the worm shaft 21 by a set screw 69 limits the travel of the ratchet gear 24 in the direction of the worm 20.

When it is desired to swing the wind pipe 16 through a wide angle, as when changing from transport to operative position or vice versa, the worm 20 is disengaged from the ring gear 15 in a manner now to be disclosed, and the wind pipe 16 pushed around by hand after first removing the trip pins 61 and 62. Disengagement of the worm 20 from the ring gear 15 is effected by moving the worm shaft 21 outwardly away from the gear 15, and to this end the bearing blocks 22 and 22' are slidably supported in slots 72 formed in two bracket members 73 and 73' which are suitably fixed to members of the frame 10. Each of the bearing blocks 22 and 22' is provided with lips or flanges 74 on the outer sides thereof which bear against the sides of the bracket members 73 and 73' to take up the end thrust forces set up by the operation of the worm 20. A cotter pin 75 holds the bearing block 22 up against bracket member 73, while the hub of the hand wheel 53 bears against the bearing block 22' to hold the latter against bracket member 73'. Journaled in the bracket members 73 and 73' beyond the slots 72 and in longitudinal alignment therewith are two axially aligned bearing spools 76 which are interconnected by a rock shaft 80. The latter is passed through apertured bosses 81 formed in the bearing spools 76 offset from the centers thereof, as best illustrated in Figures 4 and 5, and secured thereto by means of cotter pins 82 passed through aligned holes in the bosses 81 and rock shaft 80. The shaft 80 is rocked in its bearings 76 by means of a hand lever 83 which is fixed, as by welding, to the shaft 80 intermediate its ends. From the foregoing description it will be seen that the rock shaft 80 is substantially a crank, and connecting the shaft 80 with a rearwardly extending crank 84 formed on the bearing block 22 is a link 85, while a similar link 86 connects the shaft 80 with a crank 87 formed on the bearing block 22'. Thus it will be seen that by swinging the hand lever 83 back to a rearward position, the bearing blocks 22, 22' and associated worm shaft 21 will be drawn away from the ring gear 15 by the action of the rock shaft 80 and the worm 20 disengaged from the ring gear 15.

Under ordinary working conditions the friction of the ring gear 15 against the worm 20 is sufficient to hold the shaft 21 stationary against the drag of the pawl 25 over the back side of each ratchet tooth on its return stroke to engage the succeeding tooth. Consequently, however, wind pressure against the pipe 16 or improper leveling of the threshing machine may cause a slight torque to be exerted against the ring gear 15, reducing friction between the ring gear and worm 20 to a point less than the friction between the pawl 25 and ratchet teeth, with the result that the shaft 21 is oscillated through the angle described by the pawl 25 and the latter is unable to catch the next tooth. To eliminate this tendency, the shaft 21 has been provided with a friction brake 90 disposed between the worm 20 and bearing block 22 and comprising a strap 91 having suitable facing 92 which embraces the shaft 21 and is clamped to the crank 84 by a bolt and wing nut 93, by which the amount of friction can be adjusted. A cotter pin 94 holds the brake strap on the crank 84.

While I have shown and described above the preferred structure in which the principles of the present invention have been embodied, it is to be understood that my invention is not to be limited to the specific details shown and described, but that, in fact, widely different means may be employed in the greater aspects of my invention.

What I claim, therefore, and desire to secure by Letters Patent is:

1. In combination, a rotatably supported gear, a shaft disposed tangential to said gear and having a worm fixed thereon in engagement with said gear, a ratchet gear having two sets of oppositely directed teeth, means for slidably but non-rotatably mounting said ratchet gear on said shaft, ratchet pawl means adapted to engage either of said sets of teeth, means for sliding said ratchet gear whereby either of said sets of teeth is engaged by said ratchet pawl means, and means for rocking said ratchet pawl means.

2. Oscillating mechanism comprising, in combination, a rotatable driven member, a ratchet gear having two sets of oppositely directed teeth, means for operatively connecting said ratchet gear with said driven member, ratchet pawl means adapted to engage either of said sets of teeth, means for moving said ratchet gear relative to said ratchet pawl means whereby engagement of the latter is shifted from one of said sets of teeth to the other, said last named means comprising a pair of limit stops adjustably fixed to said driven member and throw-out means actuated by said limit stops and connected with said ratchet gear to move the latter.

3. In combination, a frame, a gear journaled for rotation in said frame and having a plurality of angularly spaced apertures formed on one face thereof, a shaft journaled in said frame tangent to said gear and having a worm fixed thereon in engagement with said gear, a ratchet gear slidably but non-rotatably mounted on said shaft and having two sets of oppositely directed teeth, a rachet pawl capable of engaging either of said sets of teeth, a pair of trip pins adapted to be inserted into any two of said angularly spaced apertures, a throw-out lever pivotally supported on said frame and actuated by said trip pins to slide said ratchet gear relative to said pawl whereby the latter is shifted from engagement with one of said sets of teeth to the other set, and means for oscillating said ratchet pawl.

4. Oscillating mechanism for a wind pipe or the like comprising, in combination, a ratchet gear member having two adjacent sets of oppositely directed teeth, an oscillating pawl member engageable with either of said sets of teeth, one of said members being axially slidable relative to the other member for selectively engaging said pawl with either of said sets of teeth, and means for so sliding said one member.

5. Oscillating mechanism for a wind pipe or the like comprising, in combination, a rotatable driven element, a ratchet gear member having two sets of oppositely directed teeth, driving connection between said ratchet gear member and said driven element, an oscillating pawl member engageable with either of said sets of teeth, one of said members being slidable axially relative to the other member, and means responsive to movement of said driven element past a predetermined point for sliding said one member relative to the other member whereby said pawl is disengaged from one of said sets of teeth and engaged with the other to reverse the direction of turning of said driven element.

6. In a straw stacker having a wind pipe supported for turning movement, a rotatable shaft connected with said wind pipe for turning the same, a ratchet gear having two sets of oppositely directed teeth, said gear being mounted on said shaft for axial sliding but non-rotating movement, a ratchet pawl adapted to engage either of said sets of teeth, and means for sliding said ratchet gear axially along said shaft to bring either of said sets of teeth into engagement with the ratchet pawl.

7. In a straw stacker having a wind pipe supported for turning movement, a rotatable shaft connected with said wind pipe for turning the same, a ratchet gear having two sets of oppositely directed teeth, said gear being mounted on said shaft for axial sliding but non-rotating movement, an oscillating ratchet pawl engageable with either of said sets of teeth, and means responsive to turning movement of said windpipe past a predetermined point for sliding said ratchet gear axially along said shaft to disengage one of said sets of teeth from said ratchet pawl and engage the other set therewith to reverse the direction of turning of said wind pipe.

8. Oscillating mechanism for a wind pipe or the like including a ratchet gear member comprising an annular rim having two sets of axially spaced, oppositely directed internal ratchet teeth provided on the inner surface thereof, an oscillating pawl member engageable with either of said sets of teeth, one of said members being axially slidable relative to the other member for selectively engaging said pawl with either of said sets of teeth, and means for so sliding said one member.

9. Oscillating mechanism for a straw stacker having a wind pipe supported for turning movement, said mechanism comprising a shaft having driving connection with said wind pipe for turning the same, a ratchet gear mounted on said shaft for axial sliding but non-rotating movement, said ratchet gear comprising an annular rim having two sets of axially spaced, oppositely directed internal ratchet teeth provided on the inner surface thereof, oscillating ratchet pawl means engageable with either of said sets of teeth, and means for sliding said ratchet gear along said shaft to disengage one of said sets of teeth from the ratchet pawl and engage the other set therewith to reverse the direction of turning of the wind pipe.

RALPH L. ANDERSON.